(12) United States Patent
Haka

(10) Patent No.: US 6,364,804 B1
(45) Date of Patent: Apr. 2, 2002

(54) MULTI-SPEED POWER TRANSMISSION HAVING SIX FORWARD RATIOS AND ONE REVERSE RATIO

(75) Inventor: Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/648,761

(22) Filed: Aug. 28, 2000

(51) Int. Cl.⁷ .......................... F16H 3/102; F16H 3/44
(52) U.S. Cl. .................. 475/278; 475/284; 475/325; 475/288
(58) Field of Search .................. 475/278, 279, 475/280, 281, 284, 288, 313, 325

(56) References Cited

U.S. PATENT DOCUMENTS

| | | | |
|---|---|---|---|
| 3,733,928 A | * 5/1973 | Uozumi et al. | 74/753 |
| 3,859,871 A | * 1/1975 | Uozumi et al. | 74/761 |
| 4,070,927 A | 1/1978 | Polak | 74/765 |
| 5,046,999 A | 9/1991 | Liu et al. | 475/281 |
| 5,156,575 A | * 10/1992 | Garrett | 475/59 |
| 5,194,056 A | * 3/1993 | Schiffhauer | 475/325 |
| 5,495,778 A | * 3/1996 | Mochizuki | 74/606 R |
| 5,577,976 A | 11/1996 | Haka | 475/280 |
| 5,755,637 A | * 5/1998 | Park | 475/275 |
| 6,056,659 A | * 5/2000 | McCarthy et al. | 475/116 |

* cited by examiner

Primary Examiner—Sherry Estremsky
Assistant Examiner—Tisha D. Lewis
(74) Attorney, Agent, or Firm—Laura C. Hargitt; Leslie C. Hodges

(57) ABSTRACT

A powertrain has a planetary gear arrangement that is controllable to establish six forward speed ratios and one reverse ratio through the selective engagement of six torque transmitting mechanisms. The planetary gear arrangement includes three sun gear members, a ring gear member and a planet carrier assembly member having groups of three intermeshing pinion gear members axially arranged in three gear mesh planes. A first of the gear mesh planes has a sun gear member/pinion gear member mesh, a pinion gear member/pinion gear member mesh, and a ring gear member/pinion gear member mesh. A second of the gear mesh planes has a sun member/pinion gear member mesh, and at least one pinion gear member/pinion gear member mesh. A third of the gear mesh planes has a sun gear member/pinion gear member mesh. The ring gear member is continuously connected with a transmission output shaft. The torque transmitting mechanisms include three rotary devices that are selectively connectible between an input shaft and two of the sun gear members and the planet carrier assembly member, respectively; and three stationary devices that are selectively connectible between a transmission housing and the two of the sun gear members and the planet carrier assembly member, respectively. The torque transmitting mechanisms are engaged in combinations of two to establish three forward underdrive ratios, a direct forward ratio, two forward underdrive ratios, and a reverse ratio.

6 Claims, 1 Drawing Sheet

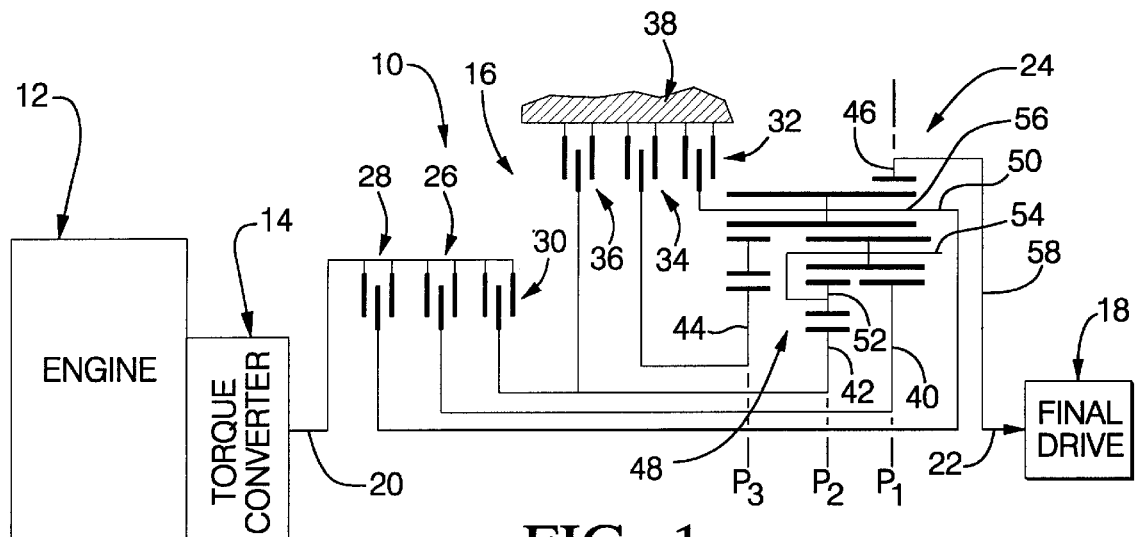
FIG. 1
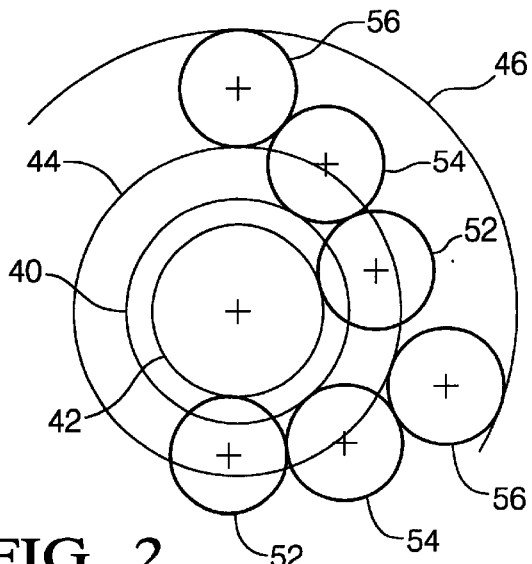
FIG. 2
| RATIOS | INPUT | REACTION | NUMBER VALUE |
|---|---|---|---|
| R | 30 | 32 | -3.00 |
| 1st | 26 | 32 | 3.70 |
| 2nd | 26 | 34 | 2.01 |
| 3rd | 26 | 36 | 1.48 |
| 4th | 26 - 28 | | 1.00 |
| 5th | 28 | 36 | 0.82 |
| 6th | 28 | 34 | 0.62 |
FIG. 3

US 6,364,804 B1

MULTI-SPEED POWER TRANSMISSION HAVING SIX FORWARD RATIOS AND ONE REVERSE RATIO

TECHNICAL FIELD

This invention relates to multi-speed power transmissions and more particularly to power transmissions having a compound planetary gear set controllable to provide six forward ratios and one reverse ratio.

BACKGROUND OF THE INVENTION

Multi-speed power transmissions are incorporated into powertrains to provide an extended operating range for the internal combustion engine that supplies the power for the powertrain. The number of ratios that are incorporated into automatic transmissions, especially for passenger car and small truck usage, has increased from two forward speed ratios to five forward speed ratios. Currently some manufacturers are considering transmissions incorporating six forward speed ratios. Examples of such proposals can be seen in the United States Patents issued to Liu and Malloy (U.S. Pat. No. 5,046,999) on Sep. 10, 1991 and Haka (U.S. Pat. No. 5,577,976) on Nov. 26, 1996.

These transmissions generally employ a Ravigneaux gear arrangement comprised of a long pinion and two or more short pinions that are intermeshing. The pinions interconnect two sun gears and two ring gears. By combining at least six selectively operable torque transmitting mechanisms (clutches and brakes), six forward speed ratios and one reverse ratio is available. The gears of these planetary arrangements are aligned in two axial planes. However the overdrive ratios achieved with these arrangements have a large step and the sixth ratio has a low numerical value.

Other six speed transmissions, having three axial planes of gears, have been proposed. One such mechanism is shown in U.S. Pat. No. 4,070,927 issued to Polak on Jan. 1, 1978. This arrangement uses three simple interconnected planetary gear sets and five torque transmitting mechanisms. The transmission described in the Polak patent has been used extensively in large trucks.

SUMMARY OF THE INVENTION

It is an object of the present invention to provide an improved multi-speed power transmission.

In one aspect of the present invention, a compound planetary gear set has three sun gear members, one ring gear member and a planet carrier assembly member. In another aspect of the present invention, the planet carrier assembly member has a pair of intermeshing long pinion gear members that interconnect two of the sun gear members and the ring gear member, and a short pinion gear member that interconnects the other sun gear member with one of the long pinion gear members. In yet another aspect of the present invention, the ring gear member is continuously connected with a transmission output shaft.

In still another aspect of the present invention, six selectively operable torque transmitting mechanisms are provided and engageable in combinations of two to establish six forward ratios and one reverse ratio. In yet still another aspect of the invention, the three sun gear members define the axial location of three gear planes with one of the gear planes containing one sun gear member, two long pinion members and the ring gear member. In a further aspect of the present invention, a second of the gear planes contains a second sun gear member, the short pinion gear member and the two long pinion gear members. In a yet further aspect of the present invention, a third of the gear planes contains the third sun gear member, and one of the long pinion gear members. In still a further aspect of the present invention, one of the long pinion gear members is engaged with other members in at least the first and third of the gear planes.

BRIEF DESCRIPTION OF THE DRAWINGS

FIG. 1 is a schematic representation of a powertrain including a compound gear arrangement incorporating the present invention.

FIG. 2 is a schematic representation depicting the meshing relationships of the gear members of the compound gear arrangement viewed in the axial direction.

FIG. 3 is a truth table describing the engagement and interchanges of the torque transmitting mechanisms that establish the ratios in the gear arrangement shown in FIG. 1.

DESCRIPTION OF AN EXEMPLARY EMBODIMENT

A powertrain 10, shown in FIG. 1, includes an engine 12, a torque converter 14, a multi-speed transmission 16, and a final drive 18. The engine 12, torque converter 14 and final drive 18 are conventional mechanisms well-known to those skilled in the art of power transmission in vehicles. The engine 12 and the transmission 16 preferably include a conventional electronic control unit (ECU), not shown, having a programmable digital computer. The ECU receives input signals from the engine 12, transmission 16 and the vehicle such as engine speed and torque, transmission input and output speed, temperature, and vehicle speed to name a few. The digital computer analyzes the signals and issues commands to control engine fuel feed, and transmission fluid pressure and ratio interchanges.

The transmission 16 has an input shaft 20, connected with the torque converter 14, an output shaft 22, connected with the final drive 18, a planetary gear arrangement 24, three rotary torque transmitting mechanisms 26, 28, and 30, and three stationary torque transmitting mechanisms 32, 34 and, 36. The final drive 18 is drivingly connected with the wheels, not shown, of the vehicle. The rotary torque transmitting mechanisms or clutches 26, 28, and 30 are each selectively connectable with the input shaft 20. The stationary torque transmitting mechanism or brakes 32, 34, and 36 are each selectively connectable with a transmission housing 38. The torque transmitting mechanisms 26, 28, 30, 32, 34, and 36 are preferably of the friction type with each having a fluid operated piston and a plurality of friction plates or discs. The stationary torque transmitting mechanism 32, 34, and 36 can, in the alternative, be constructed as band type devices having a fluid operated piston and a friction band surrounding a drum. There are other conventional torque transmitting mechanisms that can be employed also.

The planetary gear arrangement 24 includes three sun gear members 40, 42, and 44, a ring gear member 46, and a planet carrier assembly member 48. The planet carrier assembly member 48 has a planet carrier 50 that rotatably supports a short pinion gear member 52, and two long pinion gear members 54 and 56. The short pinion gear member 52 meshes with the long pinion gear member 54 which in turn meshes with the long pinion gear member 56. As is well-known, the meshing pinion gear members are arranged in three or more clusters in the planet carrier 50. The meshing pinion gear members have the radial orientation shown in FIG. 2.

The sun gear member 40 is selectively connectable with the input shaft 20 by the engagement of the torque transmitting mechanism 26. The planet carrier assembly member 48 is selectively connectable with the input shaft 20 by the engagement of the torque transmitting mechanism 28 and alternatively with the transmission housing 38 by the engagement of the torque transmitting mechanism 32. The sun gear member 42 is selectively connectable with the input shaft 20 by the engagement of the torque transmitting mechanism 30 and alternatively with the transmission housing 38 by the engagement of the torque transmitting mechanism 36. The sun gear member 44 is selectively connectable with the transmission housing 38 by the engagement of the torque transmitting mechanism 34. The ring gear member 46 is continuously connected with the output shaft 22 through a hub 58.

The sun gear member 40 meshes with the long pinion 54 to form a first gear mesh plane P1. The long pinion gear member 56 and the ring gear member 46 are also in mesh in the gear plane P1. The sun gear member 42, the short pinion gear member 52, and the long pinion gear member 54 are disposed in meshing relation in a second gear mesh plane P2. The sun gear member 44 and the long pinion gear member 56 are disposed in meshing relation in a third gear plane P3. The long pinion gear member 56 can have teeth formed continuously thereon such that it will mesh with the long pinion gear member 54 in the gear plane P2. However, manufacturing efficiency will probably dictate that the long pinion gear members 54 and 56 have teeth formed thereon only at the necessary points of mesh with other gear members. The long pinion gear member only needs to be in mesh at the gear planes P1 and P3.

To establish the reverse ratio in the planetary gear arrangement 24, the torque transmitting mechanisms 30 and 32 are engaged. The sun gear member 42 is an input member, the planet carrier assembly member 48 is a reaction member, and the ring gear member 46 is the output member. The numerical value of the reverse ratio is determined by the ratio of the number of teeth on the on the ring gear member 46 to the sun gear member 42. The gear meshes in the gear planes P2 and P1 are active.

To establish the first forward ratio, the torque transmitting mechanism 26 and 32 are engaged. A forward/reverse interchange can be achieved by the interchange of the torque transmitting mechanisms 30 and 26. During the first forward ratio, the sun gear member 40 is the input member, the planet carrier assembly member 48 is the reaction member, and the ring gear member 46 is the output member. The numerical value of the first forward ratio is determined by the ratio of the number of teeth on the ring gear member 46 to the sun gear member 40. The gear meshes in the gear plane P1 are active during this ratio which is an underdrive ratio.

To establish the second forward ratio, the torque transmitting mechanisms 32 and 34 are interchanged in a single transition shift. During the second forward ratio, the sun gear member 40 is the input member, the sun gear member 44 is the reaction member, and the ring gear member 46 is the output member. The numerical value of the second forward ratio is determined by the ratio of the number of teeth of the sun gear member 44 to the sun gear member 40, the sun gear member 44 to the ring gear member 46, and orbiting action of the planet carrier assembly member 48. The gear meshes in the gear planes P1 and P3 are active during this ratio which is an underdrive ratio.

To establish the third forward ratio, the torque transmitting mechanisms 34 and 36 are interchanged in a single transition shift. During the third forward ratio, the sun gear member 40 is the input member, the sun gear member 42 is the reaction member and the ring gear member 46 is the output member. The numerical value of the third forward ratio is determined by the tooth ratio of the sun gear member 42 to the sun gear member 40, the ring gear member 46 to the sun gear member 42, and the orbiting action of the planet carrier assembly member 48. The gear meshes in the gear planes P1 and P2 are active during this ratio which is an underdrive ratio.

To establish the fourth forward ratio, the torque transmitting mechanisms 36 and 28 are interchanged in a single transition shift. The engagement of both torque transmitting mechanisms 26 and 28 places the planetary gear arrangement 24 in a direct or one-to-one drive condition. The sun gear member 40 and the planet carrier assembly member 48 share the input member function and the ring gear member 46 is the output member.

To establish the fifth forward ratio, the torque transmitting mechanisms 26 and 36 are interchanged in a single transition shift. The planet carrier assembly member 48 is the input member, the sun gear member 42 is the reaction member, and the ring gear member 46 is the output member. The numerical value of the fifth forward ratio is determined by the ratio of the number of teeth on the sun gear member 42 to the ring gear member 46 and the orbiting action of the planet carrier assembly member 48. The gear meshes in the gear planes P1 and P2 are active during this ratio which is an overdrive ratio.

To establish the sixth forward ratio, the torque transmitting mechanisms 36 and 34 are interchanged in a single transition shift. The planet carrier assembly member 48 is the input member, the sun gear member 44 is the reaction member, and the ring gear member 46 is the output member. The numerical value of the sixth forward ratio is determined by the ratio of the number of teeth on the sun gear member 44 to the ring gear member 46 and the orbiting action of the planet carrier assembly member 48. The gear meshes in the gear planes P1 and P3 are active during this ratio.

The above described ratio interchanges define an upshift pattern. Those skilled in the art will recognize that the downshift pattern is the opposite. Also it will be apparent, from the above description and the truth table of FIG. 3, that all of the single step interchanges are of the single transition shift variety and that all of the double step ($1^{st}/3^{rd}$, $2^{nd}/4^{th}$, $3^{rd}/5^{th}$, and $4^{th}/6^{th}$) interchanges are of the single transition shift variety. The numerical values of the transmission ratios are determined with the appropriate gear members having the values shown in the following table.

| Gear member | Sun gear 40 | Sun gear 42 | Sun gear 44 | Ring gear 46 |
|---|---|---|---|---|
| Number of teeth | 30 | 24 | 66 | 111 |

What is claim is:

1. A powertrain having a multi-speed transmission comprising:
   an input shaft for receiving power from a prime mover;
   an output shaft for delivering power from said transmission;
   a planetary gear arrangement having three sun gear members, a ring gear member and a planet carrier assembly member including at least three intermeshing pinion gear members rotatably mounted on a carrier member, each of said sun gears meshing with separate ones of said pinion gear members, said ring gear member meshing with one of said pinion gear members and being continuously connected with said output shaft;

a first torque transmitting mechanism selectively connectable between said input shaft and a first of said sun gear members;

a second torque transmitting mechanism selectively connectable between said input shaft and said planet carrier assembly member;

a third torque transmitting mechanism selectively connectable between said input shaft and a second of said sun gear members;

a fourth torque transmitting mechanism selectively connectable between a transmission housing and said planet carrier assembly member;

a fifth torque transmitting mechanism selectively connectable between said transmission housing and said second of said sun gear members;

a sixth torque transmitting mechanism selectively connectable between said transmission housing and a third of said sun gear members; and said torque transmitting mechanisms being selectively engaged in combinations of two to establish three forward underdrive ratios, a direct drive ratio, two forward overdrive ratios, and a reverse ratio between said input shaft and said output shaft.

2. The transmission defined in claim 1 further comprising:

said planetary gear arrangement having three gear mesh planes;

one of said gear mesh planes including a sun gear member to pinion gear member mesh, a pinion gear member to pinion gear member mesh, and a pinion gear member to ring gear member mesh; and another of said gear mesh planes having only a sun gear member to pinion gear member mesh.

3. A powertrain having a multi-speed transmission comprising:

an input shaft;

an output shaft;

a compound planetary gear arrangement having a first sun gear member, a second sun gear member, a third sun gear member, a ring gear member, and a planet carrier assembly member including a planet carrier having three pinion gear members rotatably mounted thereon with each pinion gear member meshing with one other pinion gear member and with respective ones of said sun gears, one of said pinion gear members also meshing with said ring gear member, and said ring gear member being continuously connected with said output shaft;

said sun gear members being axially spaced to define three gear mesh planes, a first of said gear mesh planes includes a meshing relation of said first sun gear member, a first and second of said pinion gear members, and said ring gear member, a second of said gear mesh planes includes a meshing relation of said second sun gear member, a third of said pinion gear members and at least said first of said pinion gear members, and a third of said gear mesh planes includes a meshing relation of said third sun gear member and said second of said pinion gear members; and a plurality of torque transmitting mechanisms selectively operatively connected with respective ones of said sun gear members and said planet carrier assembly member and being engageable in combinations of two to establish a plurality of forward ratios and a reverse ratio between said input shaft and said output shaft.

4. The powertrain having a multi-speed transmission defined in claim 3 further comprising; said torque transmitting mechanisms including three rotary torque transmitting mechanisms and three stationary torque transmitting mechanisms;

said first sun gear member being operatively connected with a first of said rotary torque transmitting mechanisms;

said second sun gear member being operatively connected with a second of said rotating torque transmitting mechanisms and a first of said stationary torque transmitting mechanisms;

said planet carrier assembly member being operatively connected with a third of said rotary torque transmitting mechanisms and a second of said stationary torque transmitting mechanisms; and said third sun gear member being operatively connected with a third of said stationary torque transmitting mechanisms.

5. The powertrain having a multi-speed transmission defined in claim 3 further comprising:

said second sun gear member having a smaller diameter than said first and third sun gear members; and said third sun gear member having a larger diameter than said first sun gear member.

6. The powertrain having a multi-speed transmission defined in claim 3 further comprising:

said second sun gear member having a smaller diameter and less teeth than said first and third sun gear members; and said third sun gear member having a larger diameter and more teeth than said first sun gear member.

* * * * *